US012188356B2

(12) United States Patent

Telman et al.

(10) Patent No.: US 12,188,356 B2
(45) Date of Patent: Jan. 7, 2025

(54) TURBINE SEALING RING

(71) Applicant: SAFRAN AIRCRAFT ENGINES, Paris (FR)

(72) Inventors: Cyrille Telman, Moissy-Cramayel (FR); Tristan Duval, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/278,566

(22) PCT Filed: Feb. 18, 2022

(86) PCT No.: PCT/FR2022/050300
§ 371 (c)(1),
(2) Date: Aug. 23, 2023

(87) PCT Pub. No.: WO2022/180330
PCT Pub. Date: Sep. 1, 2022

(65) Prior Publication Data

US 2024/0295176 A1 Sep. 5, 2024

(30) Foreign Application Priority Data

Feb. 24, 2021 (FR) ....................................... 2101799

(51) Int. Cl.
*F01D 11/00* (2006.01)

(52) U.S. Cl.
CPC ........ *F01D 11/001* (2013.01); *F05D 2240/55* (2013.01); *F05D 2260/30* (2013.01); *F05D 2300/5021* (2013.01)

(58) Field of Classification Search
CPC .... F01D 11/001; F01D 11/005; F01D 11/006; F01D 5/066; F01D 5/3069
See application file for complete search history.

(56) References Cited

U.S. PATENT DOCUMENTS 2,773,667 A 12/1956 Wheatley
3,295,825 A 1/1967 Hall, Jr.
(Continued)

FOREIGN PATENT DOCUMENTS

EP 1 264 964 A1 12/2002
FR 2 533 620 A1 3/1984
(Continued)

OTHER PUBLICATIONS

International Search Report issued Jun. 17, 2022 in Application No. PCT/FR2022/050300.
(Continued)

*Primary Examiner* — Woody A Lee, Jr.
*Assistant Examiner* — Cameron A Corday
(74) *Attorney, Agent, or Firm* — Sughrue Mion, PLLC

(57) ABSTRACT

The present application relates to an assembly for a turbine engine (1), comprising a first rotor (2) which is rotatable about a longitudinal axis (X-X) of the turbine engine (1), the first rotor (2) comprising a first arm (26); a second rotor (3) which is rotatable about the longitudinal axis (X-X) and comprises a second arm (36); a first sealing ring (4) which is centred on the longitudinal axis (X-X), is arranged radially outside the first arm (26) and comprises a first radial flange (40) fixedly mounted between the first arm (26) and the second arm (36); and a second sealing ring (5) which is separate from the first sealing ring (4), is centred on the longitudinal axis (X-X) and is arranged radially outside the second arm (36), the second sealing ring (5) comprising a first part (51) which is designed to come into contact with the second rotor (3), and a second part (52) which is separate from the first part (51) and is designed to come into contact with the first sealing ring (4).

11 Claims, 2 Drawing Sheets

(56) References Cited

U.S. PATENT DOCUMENTS

| | | | | |
|---|---|---|---|---|
| 3,343,806 | A * | 9/1967 | Bobo | F01D 5/3007 415/117 |
| 4,526,508 | A * | 7/1985 | Antonellis | F01D 11/001 416/198 A |
| 5,236,302 | A * | 8/1993 | Weisgerber | F01D 5/06 415/199.5 |
| 10,920,593 | B2 | 2/2021 | Millier et al. | |
| 11,299,989 | B2 * | 4/2022 | Blanchard | F01D 5/066 |
| 12,006,829 | B1 * | 6/2024 | Yamarthi | F01D 11/16 |
| 2010/0074731 | A1 * | 3/2010 | Wiebe | F01D 11/005 415/173.1 |
| 2016/0138408 | A1 * | 5/2016 | Bordne | F01D 5/147 416/182 |
| 2016/0169014 | A1 | 6/2016 | Beaujard et al. | |
| 2017/0167264 | A1 * | 6/2017 | Sicard | F01D 11/001 |
| 2020/0040735 | A1 * | 2/2020 | Millier | F01D 11/02 |

FOREIGN PATENT DOCUMENTS

| | | |
|---|---|---|
| FR | 3 019 584 A1 | 10/2015 |
| FR | 3 027 341 A1 | 4/2016 |
| FR | 3 077 327 A1 | 8/2019 |

OTHER PUBLICATIONS

French Search Report issued Nov. 2, 2021 in Application No. FR2101799.

* cited by examiner

TURBINE SEALING RING

CROSS REFERENCE TO RELATED APPLICATIONS

This application is a National Stage of Application No. PCT/FR2022/050300 filed Feb. 18, 2022, claiming priority based on French Patent Application No. 2101799 filed Feb. 24, 2021, the contents of each of which being herein incorporated by reference in their entireties.

TECHNICAL FIELD

The present disclosure relates to a turbine of a turbomachine.

More specifically, the present disclosure relates to a sealing ring arranged facing a stator part of a nozzle of a turbomachine turbine.

BACKGROUND

Documents FR 3 019 584 and FR 3 077 327 describe a ring arranged between two rotors of a turbomachine turbine, facing a stator part of a nozzle of the turbine, in order to ensure the sealing between distinct cavities of a flowpath of the turbine, by cooperation of wipers of the sealing ring with an abradable of the nozzle.

The ring comprises at least one arm bearing against a rotor in order to prevent an axial movement of blades added onto the rotor (“L” ring). In some cases, the ring comprises two arms, each of which bears against one of the rotors (“Y” ring). In any case, the ring is mounted with significant axial clamping at the level of the bearing of the arm(s) against the rotor(s).

Furthermore, the ring allows the circulation of air to ventilate the blades of the rotor(s).

Finally, the arm(s) of the ring can ensure the thermal protection of the rotor(s) against hot air circulating within the flowpath.

Such a ring does not bring complete satisfaction.

Indeed, the axial clamping of the ring is carried out with such intensity that its mechanical strength is damaged. Furthermore, the mounting has become more complex.

Moreover, despite this axial clamping of high intensity, a clearance nevertheless appears between the arm(s) and the rotor(s), at the level of the bearing of the bar(s) against the rotor(s), which damages the ventilation circuit of the rotor blades.

Finally, the thermal expansions of the arm(s) deteriorate the connection between the ring and the rotor(s).

There is therefore a need to overcome at least one of the drawbacks of the state of the art in this respect.

SUMMARY

One aim of the disclosure is to improve the mechanical strength of a sealing ring of a turbine of a turbomachine.

Another aim of the disclosure is to limit the leaks within the ventilation circuit of the turbine blades.

Another aim of the disclosure is to facilitate the mounting of a sealing ring of a turbine of a turbomachine.

To this end, an assembly for a turbomachine is proposed according to a first aspect, comprising:

- a first rotor movable in rotation about a longitudinal axis of the turbomachine, the first rotor comprising a first arm,

- a second rotor movable in rotation about the longitudinal axis and comprising a second arm,
- a first sealing ring centered on the longitudinal axis, arranged radially outside the first arm and comprising a first radial flange mounted fixed between the first arm and the second arm,
- a second sealing ring, distinct from the first sealing ring, centered on the longitudinal axis and arranged radially outside the second arm, the second sealing ring comprising a first part configured to come into contact with the second rotor and a second part, distinct from the first part, configured to come into contact with the first sealing ring.

In such an assembly, the thermal expansions of the second sealing ring pull less on the first radial flange of the first sealing ring, which improves the mechanical strength of the first sealing ring and, hence, increases its life span. Furthermore, the axial clamping of the first sealing ring against the first rotor and the axial clamping of the second sealing ring against the second rotor are reduced. In fact, the first sealing ring and the second sealing ring are of reduced dimensions compared to the single sealing ring known from the state of the art. This makes it possible to limit the appearance of clearance between the first sealing ring and the first rotor on the one hand, and between the second sealing ring and the second rotor on the other hand. Thus, the leaks within the ventilation circuit of the turbine blades are reduced. Moreover, the reduction of the axial clamping reduces the mechanical stresses within the first sealing ring and the second sealing ring, which improves their mechanical strength and thus extends their life span. Finally, the mounting of the first sealing ring and of the second sealing ring is carried out in a similar manner to the mounting of the sealing ring known from the state of the art, which allows easy integration of the assembly previously described in the existing turbomachines.

Advantageously, but optionally, the assembly according to the first aspect comprises at least one of the following characteristics, taken alone or in combination:

- the second rotor has a first inner axial surface and the second sealing ring has a first outer axial surface positioned facing and at a distance from the first inner axial surface so that the first outer axial surface is configured to come into contact with the first inner axial surface upon thermal expansion of the second sealing ring,
- the first sealing ring has a second inner axial surface and the second sealing ring has a second outer axial surface positioned facing and at a distance from the second inner axial surface so that the second outer axial surface is configured to come into contact with the second inner axial surface upon thermal expansion of the second sealing ring,
- a groove is provided in the first part, the assembly further comprising a seal arranged within the groove,
- one of the second arm and of the second sealing ring comprises a lug, the other of the second arm and of the second sealing ring comprising a notch, the lug being configured to cooperate with the notch to prevent a circumferential rotation of the second sealing ring relative to the second rotor,
- an orifice is provided in the second sealing ring so as to allow circulation of a fluid between a first cavity, arranged radially inside the second sealing ring, and a second cavity arranged radially outside the second sealing ring, and the second rotor comprises:

a disk, a blade added onto the disk, and a retaining ring arranged within the second rotor and configured to prevent an axial movement of the blade relative to the disk, the second sealing ring being configured to come into contact with the retaining ring.

According to a second aspect, there is proposed a sealing ring comprising a first part configured to come into contact with the second rotor of an assembly as previously described, and a second part, distinct from the first part, and configured to come into contact with the first sealing ring of an assembly as previously described.

According to a third aspect, there is proposed a turbine section comprising an assembly as previously described.

According to a fourth aspect, there is proposed a turbomachine comprising an assembly as previously described, a sealing ring as previously described or a turbine section as previously described.

According to a fifth aspect, there is proposed an aircraft comprising a turbomachine as previously described.

DESCRIPTION OF THE FIGURES

Other characteristics, aims and advantages of the disclosure will emerge from the following description, which is purely illustrative and not limiting, and which should be read in relation to the appended drawings in which.

In all the figures, similar elements bear identical references.

DETAILED DESCRIPTION

Turbomachine

Figure 1:
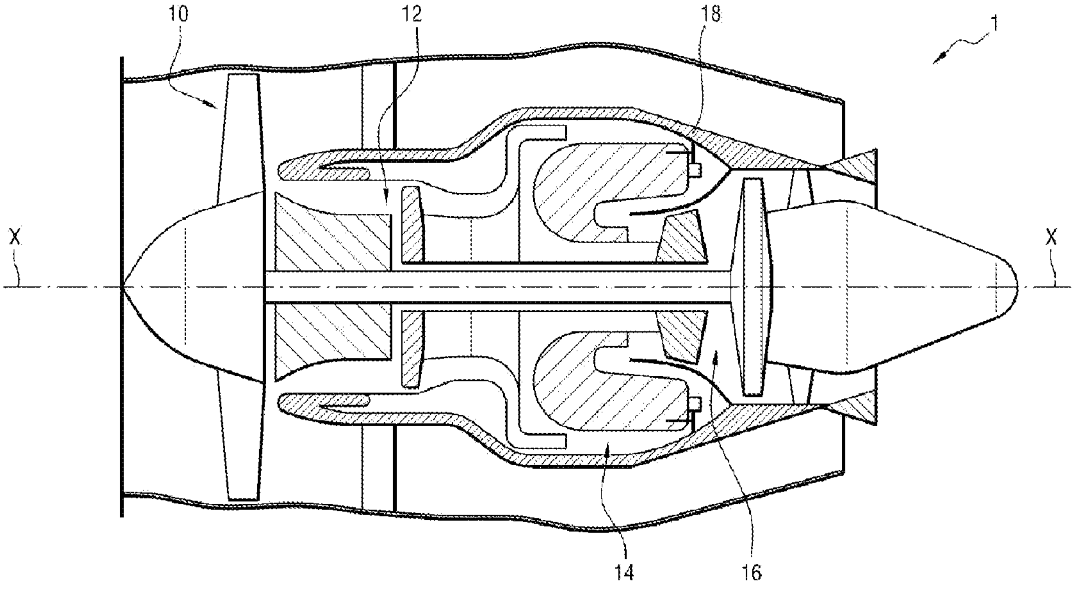
FIG. 1 is a schematic sectional view of a turbomachine.

Referring to FIG. 1, in one embodiment, a turbomachine 1 has a longitudinal axis X-X and comprises a fan 10, a compressor section 12, a combustion chamber 14 and a turbine section 16 which are capable of being driven in rotation about the longitudinal axis X-X relative to a casing 18 of the turbomachine 1.

In operation, the fan 10 draws in an air stream whose portion is successively compressed within the compressor section 12, ignited within the combustion chamber 14, and expanded within the turbine section 16 before being ejected out of the turbomachine 1. In this way, the turbomachine 1 generates a thrust. This thrust can moreover be put to the benefit of an aircraft (not represented) onto which the turbomachine 1 is added and fixed.

In the present text, the upstream and the downstream are defined relative to the normal direction of flow of the air through the turbomachine 1 in operation. Likewise, an axial direction corresponds to the direction of the longitudinal axis X-X, a radial direction refers to a direction which is perpendicular to this longitudinal axis X-X and passes therethrough, and a circumferential or tangential, direction corresponds to the direction of a curved planar and closed line, all points of which are equidistant from the longitudinal axis X-X.

Furthermore, and unless otherwise specified, the terms "inner (or internal)" and "outer" (or external)", respectively, are used in reference to a radial direction so that the inner (i.e. radially inner) part or surface of an element is closer to the longitudinal axis X-X than the outer (i.e. radially outer) part or surface of the same element.

Turbine

Figure 2:
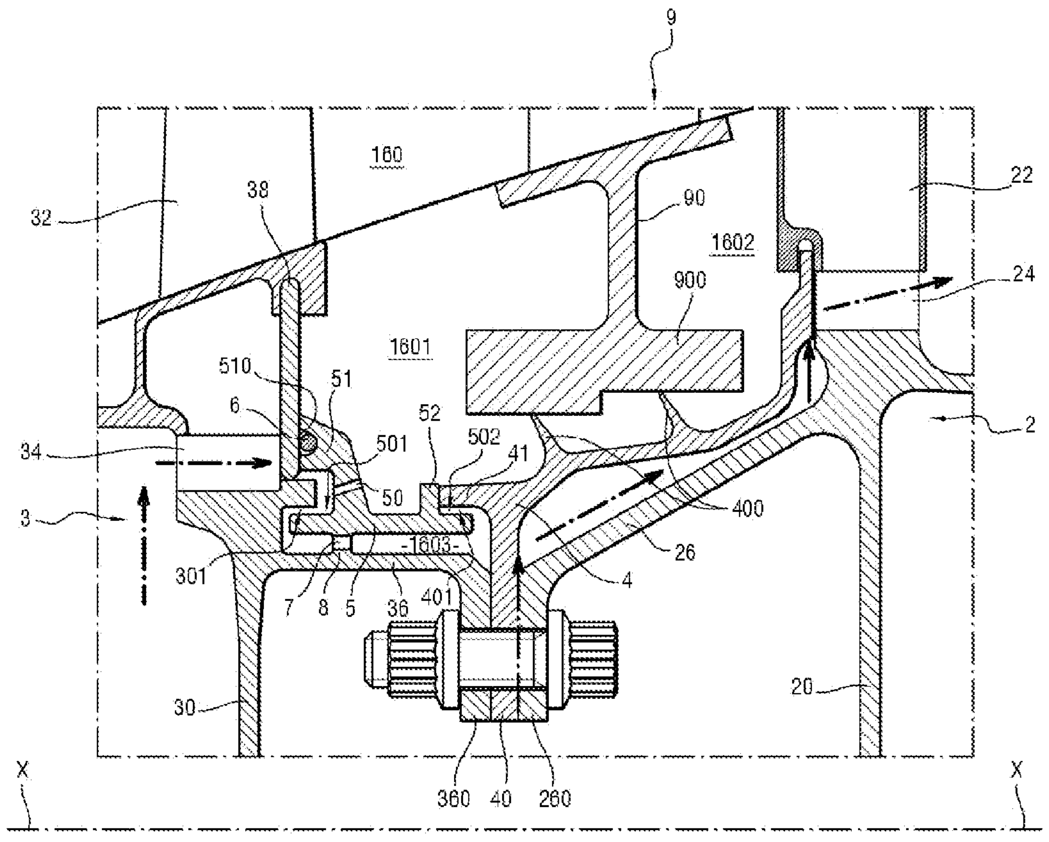
FIG. 2 is a schematic sectional view of one exemplary embodiment of an assembly.

Referring to FIG. 2, the turbine section 16 comprises a first rotor 2 movable in rotation relative to the casing 18 about the longitudinal axis X-X. The first rotor 2 comprises a first disk 20, a first blade 22 connected to the first disk 20, typically by being fitted within a first cell 24 of the first disk 20, and a first shroud visible, in FIG. 2, in the form of a first arm 26 in an axial cross-section, the first arm 26 extending upstream of the first disk 20.

The turbine section 16 also comprises a second rotor 3 movable in rotation relative to the casing 18 about the longitudinal axis X-X. The second rotor 3 comprises a second disk 30, a second blade 32 added onto the second disk 30, typically by being fitted within a second cell 34 of the second disk 30, and a second shroud visible, in FIG. 2, in the form of a second arm 36 in an axial cross-section, the second arm 26 extending downstream of the second disk 30. Furthermore, a retaining ring 38 is advantageously arranged within the second rotor 3 and configured to prevent axial movement of the second blade 32 relative to the second disk 30.

The first arm 26 is preferably fixed to the second arm 36, for example by means of a bolted connection as illustrated in FIG. 2. Such a bolted connection is conventionally made up of scalloped flanges 260, 360 of each of the first arm 26 and of the second arm 36, the scalloped flanges 260, 360 being arranged facing each other during the mounting, bolts then being inserted into the orifices of the scalloped flanges 260, 360.

Furthermore, in one embodiment, the turbine section 16 comprises a nozzle 9, arranged radially outside the first arm 26 and the second arm 36. The nozzle 9 comprises a stator 90 comprising an abradable 900 at the level of its inner radial end.

The first blade 22, the second blade 32 and the stator 90 thus extend into the flowpath 160 within which the air expanded by the turbine section 16 in operation circulates.

Sealing Rings

Referring to FIG. 2, a first sealing ring 4 centered on the longitudinal axis X-X is arranged radially outside the first arm 26. The first sealing ring 4 comprises a first radial flange 40 mounted fixed between the first arm 26 and the second arm 36, typically by being scalloped in a pattern identical to the scalloped flanges 260, 360 of the first arm 26 and of the second arm 36, so as to be engaged in the bolted connection. In one embodiment, the first sealing ring 4 further comprises sealing wipers 400 extending radially outwards so as to be able to cooperate with the abradable 900 of the stator 90. Thus, air cannot circulate from a first cavity 1601 located upstream of the abradable 900 to a second cavity 1602 located downstream of the abradable 900.

A second sealing ring 5, distinct from the first sealing ring 4 and centered on the longitudinal axis X-X, is arranged radially outside the second arm 36. The term "distinct" means that the first sealing ring 4 and the second sealing ring 5 are not monolithic. Thus, unlike the monolithic Y-ring which is known from the state of the art, in the assembly illustrated in FIG. 2, the first sealing ring 4 is separated from the second sealing ring 5, so that the first radial flange 40 is less biased radially outwards. This significantly increases the life span of the orifices and scallops of the bolted connection. In any case, the second sealing ring 5 also serves as a heat shield for the second arm 36, in order to protect it from the heat of the air circulating within the first cavity 1601.

As illustrated by the dotted arrows which are visible in FIG. 2, the assembly formed of the first rotor 2, of the first sealing ring 4, of the second rotor 3 and of the second sealing ring 5 defines a ventilation circuit within which air configured to cool the first blade 22 and the second blade 32 circulates.

As illustrated in FIG. 2, the second sealing ring 5 comprises a first part 51 configured to come into contact with the second rotor 3, preferably with the retaining ring 38. Thus, the axial clamping upstream of the second sealing ring 5 is distributed over the second rotor 3. Furthermore, the second sealing ring 5 comprises a second part 52, distinct from the first part 51, configured to come into contact with the first sealing ring 4. The term "distinct" means that the first part 51 is not configured to come into contact with the first sealing ring 4 or the second part 52 is not configured to come into contact with the second rotor 3. Thus, the first sealing ring 4 and the second rotor 3 act as axial abutments for the second sealing ring 5.

In one embodiment visible in FIG. 2, the second rotor 3 has a first inner axial surface 301 and the second sealing ring 5 has a first outer axial surface 501 positioned facing and at a distance from the first inner axial surface 301 so that the first outer axial surface 501 is configured to come into contact with the first inner axial surface 301 during thermal, preferably radial, expansion of the second sealing ring 5. Typically, the radially inner bottom of the second cell 34 is elongated downstream, as seen in FIG. 2, so as to form the first inner axial surface 301.

In one embodiment, the first sealing ring 4 has a second inner axial surface 401 and the second sealing ring 5 has a second outer axial surface 502 which is positioned facing and at a distance from the second inner axial surface 201 so that the second outer axial surface 502 is configured to come into contact with the second inner axial surface 201 during thermal, preferably radial, expansion of the second sealing ring 5. Typically, the first sealing ring 4 comprises an axial flange 41 extending upstream, as seen in FIG. 2, so as to form the second inner axial surface 201.

Radial clearances can thus be advantageously provided upstream and downstream of the second sealing ring 5, corresponding, respectively, to the space separating the first outer axial surface 501 from the first inner axial surface 301, and the space separating the second outer axial surface 502 from the second inner axial surface 201. Thus, the radial contact between the second sealing ring 5 and, respectively, the second rotor 3 and the first sealing ring 4, is punctual. More specifically, it only takes place when the second sealing ring 5 reaches such a heat that it expands radially outwards. Consequently, the first radial flange 40 is less biased radially outwards, since it is pulled radially outwards only when the second sealing ring 5 comes into radial contact with the first sealing ring 4, at the level of the axial flange 41. This substantially increases the life span of the orifices and the scallops of the bolted connection. Furthermore, the bottom of the second cell 34 and the axial flange 41 act as radial abutments for the second sealing ring 5.

In one embodiment, one of the second arm 36 and of the second sealing ring 5 comprises a lug 7, the other of the second arm 36 and of the second sealing ring 5 comprising a notch 8. The lug 7 is configured to cooperate with the notch 8 to prevent circumferential rotation of the second sealing ring 5 relative to second rotor 3. The cooperation of the lug 7 and of the notch 8 acts as a tangential abutment for the second sealing ring 5. It is possible to provide for a plurality of lugs 7 and notches 8 distributed all about the longitudinal axis X-X in order to distribute the mechanical stresses.

In one embodiment, a groove 510 is provided in the first part 51 of the sealing ring. Furthermore, a seal 6 is arranged within the groove 510. The cooperation of the seal 6 and of the second rotor 3 makes it possible to limit the leaks within the ventilation circuit, in the event that an axial clearance appears between the second rotor 3 and the second sealing ring 5, despite the clamping implemented during the mounting.

In one embodiment, an orifice 50 is provided in the second sealing ring 5 so as to allow circulation of a fluid between a third cavity 1603, arranged radially inside the second sealing ring 5, and the first cavity 1601, which is radially arranged outside the second sealing ring 5. This makes it possible to increase the pressurization in the first cavity 1601 in order to counter the circulation of air coming from the flowpath 160 and thus relieves the sealing wipers and the abradable 900. Preferably, a plurality of orifices 50 are provided in the second sealing ring 5, for example by being circumferentially distributed all about the longitudinal axis X-X.

The invention claimed is:

1. An assembly comprising:
- a first rotor movable in rotation about a longitudinal axis of a turbomachine, the first rotor comprising a first arm;
- a second rotor movable in rotation about the longitudinal axis, and comprising a second arm fixed to the first arm;
- a first ring centered on the longitudinal axis, the first ring comprising a first radial flange fixedly mounted between the first arm and the second arm, the first ring having a first radially outer surface and a first radially inner surface, and the first ring comprising sealing wipers extending radially outwardly from the first radially outer surface; and
- a second ring centered on the longitudinal axis the second ring having a second radially outer surface positioned facing and at a distance from the first radially inner surface of the first ring, the second ring being configured so that the second radially outer surface comes into contact with the first radially inner surface upon thermal expansion of the second ring.

2. The assembly of claim 1, wherein the second rotor has a second radially inner surface and the second ring has a third radially outer surface positioned facing and at a distance from the second radially inner surface, the second ring being configured so that the third radially outer axial surface is comes into contact with the second radially inner surface upon thermal expansion of the second ring.

3. The assembly of claim 1, wherein the second ring has a contacting surface contacting the second rotor, a groove being provided in the contacting surface, the assembly further comprising a seal arranged within the groove.

4. The assembly of claim 1, wherein one of the second arm and of the second ring comprises a lug, the other of the second arm and of the second ring comprising a notch, the lug cooperating with the notch to prevent a circumferential movement of the second ring relative to the second rotor.

5. The assembly of claim 1, wherein an orifice is provided in the second ring so as to allow a circulation of a fluid between a first cavity arranged radially inside the second ring and a second cavity arranged radially outside the second ring.

6. The assembly of claim 1, wherein the second rotor comprises:
- a disk,
- a blade connected to the disk, and a retaining ring arranged within the second rotor and configured to prevent axial movement of the blade relative to the disk, the second ring contacting the retaining ring.

7. A turbine section comprising the assembly of claim 1 and a nozzle, the nozzle being arranged between the first rotor and the second rotor, and comprising an abradable configured to cooperate with the sealing wipers of the first ring.

8. A turbomachine comprising the turbine section of claim 7.

9. An aircraft comprising the turbomachine of claim 8.

10. A turbomachine comprising:

the assembly of claim 1; and a casing, the first rotor and the second rotor being movable relative to the casing.

11. An aircraft comprising the turbomachine of claim 10.

* * * * *